United States Patent
Smith et al.

(10) Patent No.: US 6,526,858 B1
(45) Date of Patent: Mar. 4, 2003

(54) CABLE BREAKAWAY ASSEMBLY

(75) Inventors: Kelly J. Smith, Aledo, TX (US); Kevin L. Strause, Keller, TX (US); Manuel A. Torres, Haltom City, TX (US)

(73) Assignee: Corning Cable Systems LLC, Hickory, NC (US)

(*) Notice: Subject to any disclaimer, the term of this patent is extended or adjusted under 35 U.S.C. 154(b) by 46 days.

(21) Appl. No.: 09/693,368

(22) Filed: Oct. 20, 2000

(51) Int. Cl.$^7$ ................................................. B26D 1/02
(52) U.S. Cl. ............................ 83/856; 83/950; 192/150; 166/54.5
(58) Field of Search .................. 83/950, 639.4, 83/370, 856, 857, 200.1; 114/221 A, 215, 217; 166/54.5, 54.6; 285/1, 2; 225/21; 187/349; 192/150

(56) References Cited

U.S. PATENT DOCUMENTS

| | | | | |
|---|---|---|---|---|
| 2,396,731 A | * | 3/1946 | Wiener | |
| 2,495,732 A | * | 1/1950 | Jesson | |
| 2,751,163 A | * | 6/1956 | Waltz | |
| 3,122,046 A | * | 2/1964 | Baker | |
| 3,621,744 A | * | 11/1971 | Kelly | 83/198 |
| 3,882,748 A | * | 5/1975 | Moore | 114/221 A |
| 3,926,252 A | * | 12/1975 | Ribeyre et al. | 114/221 A |
| 3,962,943 A | * | 6/1976 | Allen | 83/360 |
| 4,640,163 A | * | 2/1987 | Douglas | 114/221 A |
| 4,653,776 A | * | 3/1987 | Borg | 166/363 |
| 6,397,948 B1 | * | 6/2002 | Williams et al. | 114/221 A |

* cited by examiner

Primary Examiner—Kenneth E. Peterson
(74) Attorney, Agent, or Firm—Christopher C. Dremann

(57) ABSTRACT

A cable breakaway assembly is adapted for mounting within a stationary component of a communications service network to prevent damage to a feeder cable in the event that an excessive pulling force is applied to a customer cable spliced to the feeder cable. In one embodiment, the cable breakaway assembly comprises a generally symmetric base, at least one cutting blade fixed to the base, and a swing arm rotatably attached to the base and movable between an extended position and a retracted position. The communications cable is secured to the swing arm by a cable clamp and the swing arm is biased in the extended position by a torsion spring. When the excessive force is applied to the customer cable the swing arm rotates to the retracted position, thereby bringing the communications cable into contact with the cutting blade and severing the communications cable. In another embodiment, the base defines a cavity and the swing arm is replaced by a cable block resiliently positioned within the cavity. The cable block is biased in the extended position by at least one linear coil spring positioned within the fig cavity between the cable block and the base.

10 Claims, 3 Drawing Sheets

CABLE BREAKAWAY ASSEMBLY

CROSS REFERENCE TO RELATED APPLICATIONS (none)

FIELD OF THE INVENTION

The present invention relates generally to communications network hardware. More particularly, the invention is an apparatus and method for preventing damage to a communications feeder cable in the event that an excessive pulling force is applied to a customer cable spliced to the feeder cable, while at the same time minimizing and localizing the damage to the customer cable.

BACKGROUND OF THE INVENTION

Communications service providers are installing vast networks of fiber optic backbones and metropolitan rings to meet the ever increasing demand for broadband communications services. Many customers of broadband communications services, and particularly e-commerce businesses, depend on the integrity of the fiber optic network for day-to-day business operations. A loss of communications service for even a short period of time could have serious consequences for a start-up, or even a well established business that relies extensively on electronic or Internet sales. As a result, these networks of fiber optic backbones and metropolitan rings are extremely precious resources to both the network service provider and the customer.

In many cases, the network service provider's distribution cables that form the fiber optic backbones and metropolitan rings, referred to herein as "feeder cables," are installed underground. As new customers request broadband communications services, additional fiber optic service drop cables, referred to herein as "customer cables," are spliced to a feeder cable in the communications network. Each new customer cable added to the network increases the likelihood that the security of the network will be compromised by an excessive pulling force applied to the customer cable. For example, the operator of an auger or backhoe may inadvertently contact the customer cable during a trenching operation. If the auger or backhoe entangles the customer cable, an excessive pulling force may be applied to the customer cable, and ultimately, to the feeder cable spliced to the customer cable. In severe cases, several thousand feet of fiber optic cable may be damaged beyond repair before the tensile strength of the feeder cable or the splice is exceeded.

It is therefore likely that extensive damage to the optical fibers of the customer cable or the feeder cable, or both, will occur in the event that an excessive pulling force is applied to a customer cable. Such damage not only results in a catastrophic loss of service, but is also time consuming and expensive for the communications service provider to locate and repair. In addition, the damage to the fiber optic cable may not be limited to the relatively short segment of the customer cable, and instead, may extend over a substantial length of the feeder cable as well. Furthermore, it may be difficult for the communications service provider to access the damaged portions of the customer cable and the feeder cable to accomplish a suitable repair.

SUMMARY OF THE INVENTION

Accordingly, it is apparent that a need exists for an apparatus and method for preventing damage to a communications feeder cable in the event that an excessive pulling force is applied to a customer cable spliced to the feeder cable. A further, and it more particular, need exists for an apparatus and method that minimizes the damage caused by an excessive pulling force applied to a customer cable spliced to a feeder cable of a communications network. A further need exists for an apparatus and method that provides a convenient and accessible location to repair a customer cable that is damaged as a result of an excessive pulling force applied to a customer cable. Additional features and advantages of the invention will be set forth in the following description, and, in part, will be apparent from the description, or may be learned by practice of the invention. These objectives and other advantages of the invention will be realized and attained by the cable breakaway assembly particularly pointed out in the written description and claims hereof, as well as the accompanying drawings.

To achieve these and other advantages, and in accordance with the purpose of the invention as embodied and broadly described herein, the present invention is directed to a cable breakaway assembly that is secured to a stationary structural component of a communications service network. The cable breakaway assembly severs a customer cable of the communications service network at a convenient, accessible location in the event that an excessive pulling force is applied to the customer cable.

In particular, a cable breakaway assembly is provided for preventing damage to a first portion of a communications cable in the event that an excessive pulling force is applied to a second portion of the communications cable. The cable breakaway assembly includes a base adapted for mounting to a stationary structural component of a communications service network, at least one cutting blade fixed to the base, and movable means attached to the base for bringing the communications cable into contact with the cutting blade when the excessive pulling force is applied to the second portion of the communications cable and thereby severing the communications cable.

In a preferred embodiment, the movable means includes a swing arm rotatably attached to a pivot provided on the base. The communications cable is secured to the swing arm and the swing arm is biased in an extended position by a torsion spring. The swing arm rotates to a retracted position and the communications cable is brought into contact with the cutting blade when the pulling force applied to the second portion of the communications cable exceeds the biasing force of the torsion spring. In an alternative embodiment, the base defines a cavity and the movable means includes a cable block resiliently mounted within the cavity. The communications cable is secured to the cable block and the sliding block is biased in the extended position by at least one linear coil spring positioned within the cavity between the cable block and the base. The cable block moves to the retracted position and the communications cable is brought into contact with the cutting blade when the pulling force applied to the second portion of the communications cable exceeds the biasing force of the coil spring.

In another aspect, the invention provides a method for preventing damage to a first portion of a communications cable in the event that an excessive pulling force is applied to a second portion of the communications cable. In particular, the method includes the first step of routing the communications cable to a stationary component of a communications service network. The method includes the second step of securing the communications cable to the stationary component of the communications service network. The method includes the third step of routing the cable to a cable breakaway assembly, the cable breakaway assembly including a base, at least one cutting blade fixed to the base, and a movable means for bringing the communications cable into contact with the cutting blade when the excessive pulling force is applied to the second portion of the communications cable. The method includes the fourth and final step of severing the communications cable with the at least one cutting blade when the excessive pulling force is applied to the second portion of the cable. The method may include the further steps of securing the communications cable to the movable means and providing a predetermined amount of slack cable within the stationary component of the communications service network.

It is to be understood that both the foregoing general description and the following detailed description are exemplary and explanatory and are intended to provide further explanation of the invention as claimed. The accompanying drawings are included to provide a further understanding of the invention and are incorporated in and constitute a part of this specification, illustrate one or several embodiments of the invention, and, together with the description, serve to explain the principles of the invention.

BRIEF DESCRIPTION OF THE DRAWINGS

One or more preferred embodiments of the invention will be described more fully below and illustrated in the accompanying drawings in which.

DETAILED DESCRIPTION OF THE PREFERRED EMBODIMENTS

Figure 1:
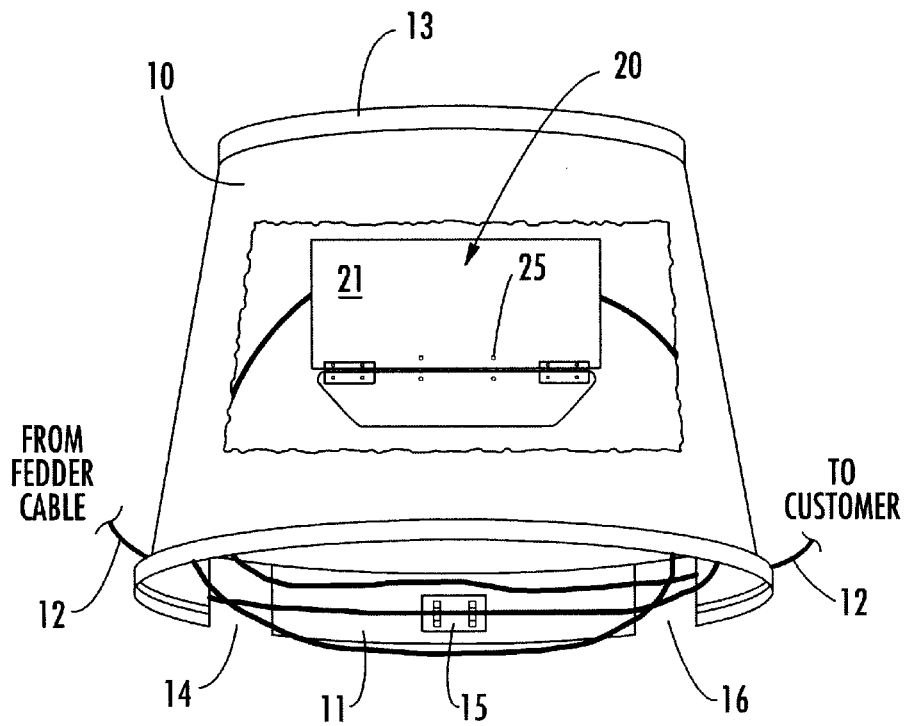
FIG. 1 is a perspective view of a preferred embodiment of a cable breakaway assembly according to the invention shown mounted within a conventional hand hole and with the protective cover closed.

Referring now to the accompanying drawings, in which one or more preferred embodiments of the invention are illustrated, FIGS. 1–5 show a preferred embodiment of a cable breakaway assembly, indicated generally at 20, according to the invention. More specifically, FIG. 1 is a perspective view of a cable breakaway assembly 20 mounted within a conventional hand hole 10 that serves as an access location or distribution point along a communications service network, for example a backbone or metropolitan ring. However, the cable breakaway assembly 20 may be mounted to any stationary component of a communications service network, such as a telephone pole, manhole, wall, or other structure along the network route. Furthermore, the cable breakaway assembly 20 may be mounted within a network interface device (NID), splice closure, or building entrance terminal (BET) that is secured to a stationary component of the network. In the preferred embodiments of the invention shown and described herein, the cable breakaway assembly 20 is mounted to hand hole 10 provided at an access location or distribution point along the backbone or metropolitan ring of a fiber optic communications network.

As shown in FIG. 1, a fiber optic communications cable 12 is routed through the hand hole 10 in a known manner. Typically, communications cable 12 is a fiber optic service drop cable, such as a customer cable, that is spliced adjacent the hand hole 10 to a feeder cable of the fiber optic communications network. The communications cable 12 enters the hand hole 10 from the splice point through an entrance port 14 provided near the base of the hand hole 10. Upon entering the hand hole 10, the communications cable 12 is strain relieved utilizing a conventional strain relief means 15, such as a cable tie, cable clamp, compression sleeve, etc. As shown herein, strain relief means 15 comprises a cable clamp back plate and at least one adjustable cable clamp. The communications cable 12 is next routed to the cable breakaway assembly 20 and secured thereto, as will be described. The communications cable 12 is then routed back to the base of the hand hole 10 and exits the hand hole 10 to the customer through an exit port 16.

Preferably, as shown, at least one loop of slack communications cable 12 is formed in the hand hole 10 before the communications cable 12 exits the hand hole 10 through the exit port 16. The additional length of communications cable 12 is provided to compensate for fluctuations in the length of the cable 12 due to variations in ambient temperature, installation pulling forces, duct length compensation, accidental contact with the cable 12 that is not excessive, and further, in the event that it is necessary to re-route the cable 12 after initial installation. The strain relief means 15 is preferably mounted to the interior surface of the sidewall 11 near the base of the hand hole 10 medially between the entrance port 14 and the exit port 16. The strain relief means 15 may be mounted to the sidewall 11 in any conventional manner, but is preferably mounted to the sidewall 11 with fasteners that extend through the sidewall 11 and the cable clamp back plate from the exterior of the hand hole 10. The cable breakaway assembly 20 is preferably mounted to the sidewall 11 beneath the ridge 13 of the hand hole 10 directly above the strain relief means 15. The cable breakaway assembly 20 may be mounted to the sidewall 11 in any conventional manner, but is preferably mounted to the sidewall 11 with fasteners that extend through the sidewall 11 and the cable breakaway assembly 20 from the exterior of the hand hole 10, as will be described.

Figure 2:
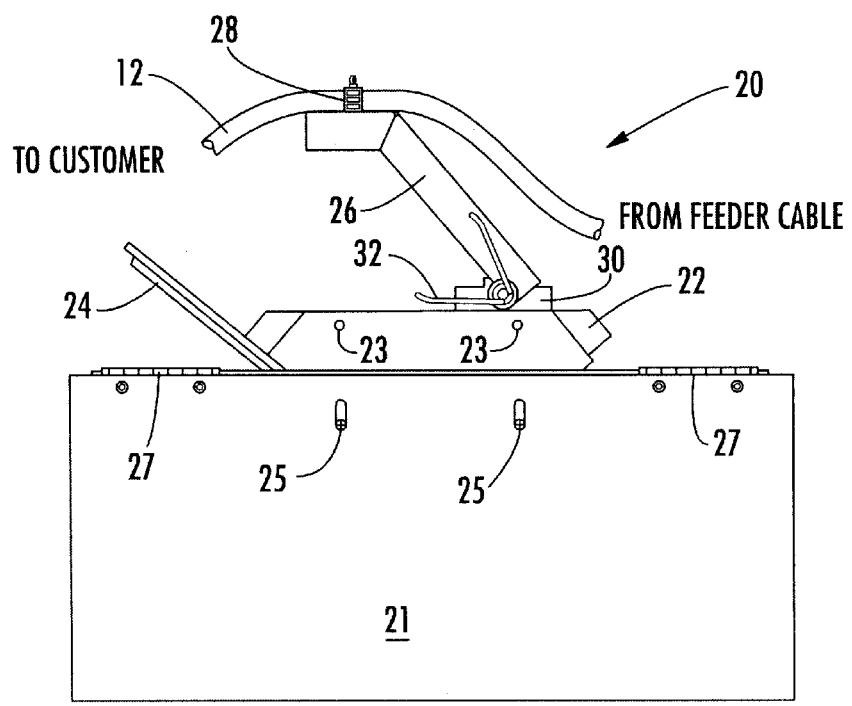
FIG. 2 is a side elevation view of the cable breakaway assembly of FIG. 1 shown with the protective cover opened and the swing arm biased in the extended position.

As best shown in FIG. 2, the cable breakaway assembly 20 comprises a protective cover 21, a base 22, at least one cutting blade 24 fixed to the base 22, and a swing arm 26 rotatably attached to the base 22. Preferably, a plurality of holes are formed through sidewall 11 and one or more back plates (not shown) are provided on the exterior of sidewall 11. Externally threaded fasteners extend through the back plate(s) and the holes in the sidewall 11 and engage a corresponding plurality of internally threaded holes 23 in the base 22 of the cable breakaway assembly 20. In the event that access to the exterior of sidewall 11 of the hand hole 10 is limited, internally threaded inserts (not shown) may be press fit into the plurality of holes formed through sidewall 11. The base 22 may then be secured to the sidewall 11 by externally threaded fasteners that extend through holes 23 from the interior of hand hole 10 to engage the inserts.

Once the cable breakaway assembly 20 is mounted to the sidewall 11 of the hand hole 10, the protective cover 21 is positioned over the base 22, the cutting blade 24 and the swing arm 26, and secured by cover fasteners 25 to the uppermost pair of holes 23 provided in the base 22. Cover fasteners 25 may be externally threaded, but preferably are quick connect/disconnect type fasteners so that protective cover 21 may be readily opened and closed. The upper portion of the protective cover 21 may be rotated about hinges 27 and secured in the opened position by engaging cover fasteners 25 with the lowermost pair of holes 23 provided in the base 22 to expose the upper portion of the base 22, the at least one cutting blade 24 and the swing arm 26. The base 22, the cutting blade 24, and the swing arm 26 are exposed so that the communications cable 12 may be properly positioned within the cable breakaway assembly 20.

As previously mentioned, the communications cable 12 is routed from the interior of the hand hole 10 into the cable breakaway assembly 20. An arcuate cable guide (not shown) may be provided to insure that the minimum bend radius of the communications cable 12 is not exceeded as the cable 12 is routed to the swing arm 26 of the cable breakaway assembly 20. The communications cable 12 is secured to the swing arm 26, and preferably to the upper portion of the swing arm 26, by a conventional strain relief means 28, such as a cable tie, cable clamp, compression sleeve, etc. As shown, strain relief means 28 comprises at least one adjustable cable clamp. The communications cable 12 is secured to the swing arm 26 so that the cable 12 is movable relative to the base 22 and the cutting blade 24, as will be described.

The lower portion of the swing arm 26 is rotatably attached to the base 22 about a fixed pivot 30 provided on the upper surface of the base 22. The swing arm 26 is biased in the extended position indicated by the solid lines in FIG. 2 and the phantom lines in FIG. 3. The swing arm 26 may be biased in the extended position in any known manner, but preferably is biased by a conventional torsion spring 32 positioned between a pair of upwardly extending, opposed, longitudinal flanges 31 (FIGS. 4 and 5) formed on the pivot 30. The torsion spring 32 is selected to provide a sufficient biasing force to maintain the swing arm 26 in the extended position against the magnitude of the pulling forces encountered by the communications cable 12 under normal operating conditions. However, the biasing force of the torsion spring 32 is exceeded and the swing arm rotates to the retracted position indicated by the solid lines in FIG. 3 when the magnitude of the pulling force exerted on the communications cable 12 is greater than a predetermined amount, such as may occur when the customer cable portion of the communications cable 12 is inadvertently entangled by an errant augur or trenching operation.

Figure 3:
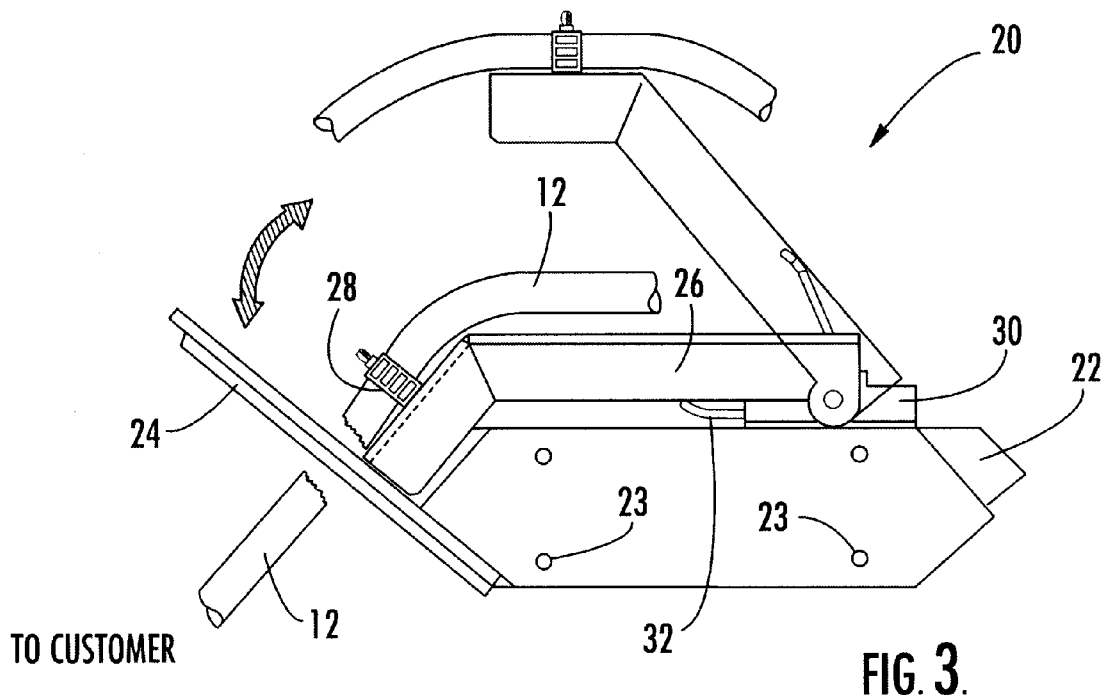
FIG. 3 is a side elevation view of the cable breakaway assembly of FIG. 1 with the swing arm in the extended position indicated by phantom lines and the swing arm in the retracted position indicated by solid lines.

As illustrated in FIG. 3, the swing arm 26 is movable between the extended position, indicated by the phantom lines, and the retracted position, indicated by the solid lines. When the swing arm 26 moves from the extended position to the retracted position, the communications cable 12 is brought into contact with the cutting blade 24, and is thus severed. For example, if the communications cable 12 comprises a customer cable spliced to a feeder cable adjacent or within the hand hole 10 and an excessive pulling force is applied to the customer cable, tension on the strain relief means 28 will cause the swing arm 26 to rotate relative to the base 22 from the extended position to the retracted position and the communications cable 12 will be severed by the cutting blade 24. As a result, a relatively clean break of the communications cable 12 will occur at the location of the cable breakaway assembly 20 before the feeder cable portion of the communications cable 12 is damaged. Typically, it is far easier to repair or replace a damaged customer cable spliced to a feeder cable than to repair or replace the feeder cable. In addition to limiting the damage to the customer cable portion of the communications cable 12, the cable breakaway assembly 20 provides a convenient, accessible location to accomplish a repair to the customer cable.

Figure 4:
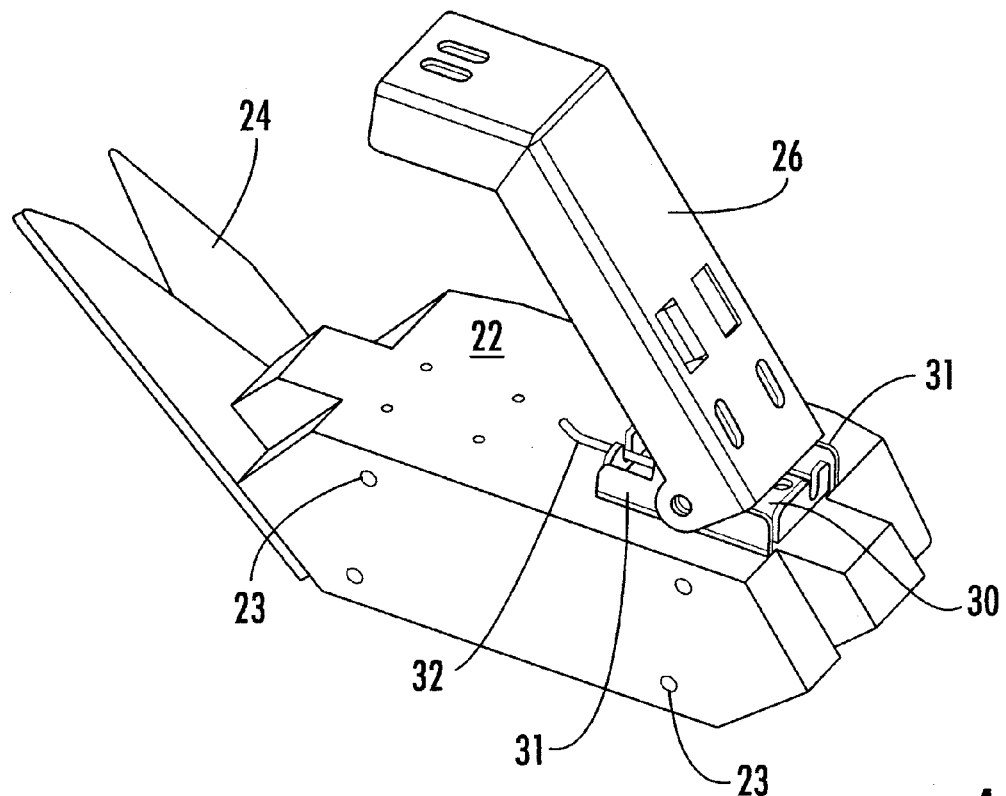
FIG. 4 is a perspective view of the cable breakaway assembly of FIG. 1 shown with the swing arm in the extended position.
Figure 5:
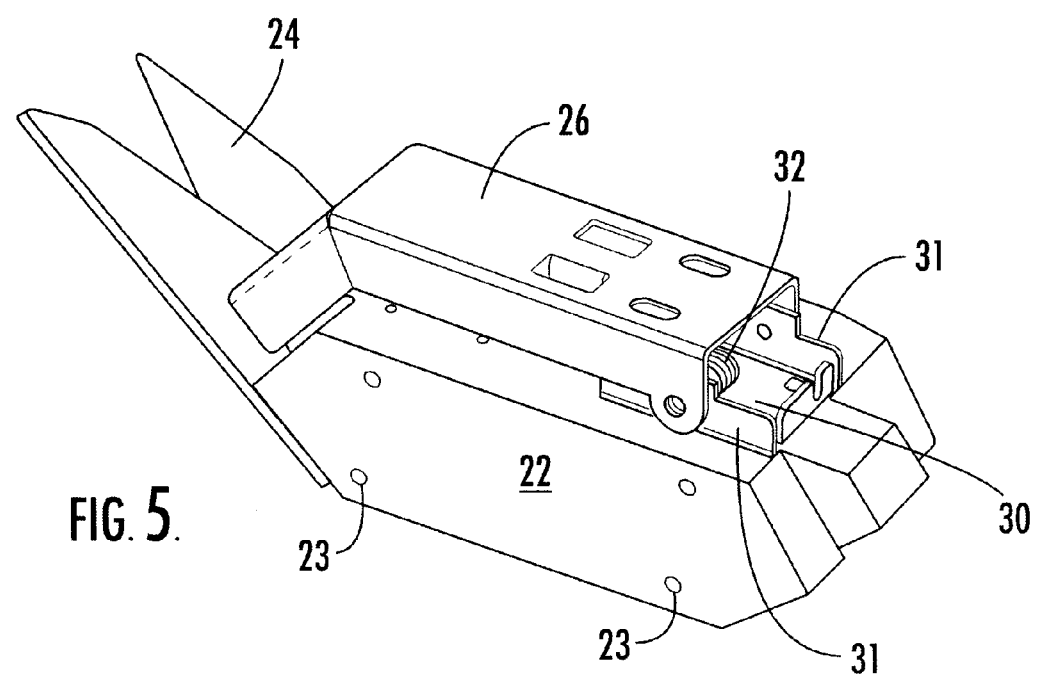
FIG. 5 is a perspective view of the cable breakaway assembly of FIG. 1 shown with the swing arm in the retracted position.

As best shown in FIGS. 4 and 5, the base 22, including the patterns of the holes 23 for mounting the base 22 to the sidewall 11 of the hand hole 10 and the holes 33 for securing the pivot 30 to the base 22, is shaped to be generally symmetric about the longitudinal and lateral axes. Accordingly, the relative locations of the cutting blade 24 and the pivot 30 may be reversed to accept a communications cable 12 that is routed in the opposite direction through the hand hole 10. In this manner, the cable breakaway assembly 20 may be utilized for both left-hand and right-hand installations by merely reversing the base 22 on the sidewall 11 of the hand hole 10, and thus, the direction of rotation of the swing arm 26. Similarly, the direction of rotation of the swing arm 26 may also be reversed by reversing the locations of the cutting blade 24 and the pivot 30 without removing the base 22 from the side wall 11 of the hand hole 10.

Figure 6:
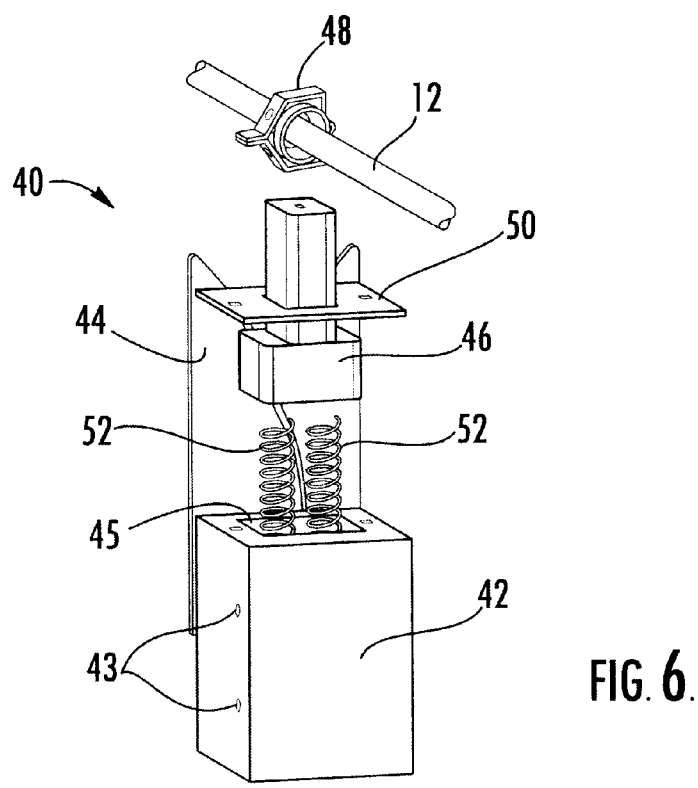
FIG. 6 is an exploded view of an alternative embodiment of a cable breakaway assembly according to the invention.

An alternative embodiment of a cable breakaway assembly, indicated generally at 40, is shown in FIG. 6. The cable breakaway assembly 40 operates in substantially the same manner as the cable breakaway assembly 20 to prevent damage to the feeder cable portion of the communications cable 12 in the event that an excessive pulling force is applied to the customer cable portion. The cable breakaway assembly 40 comprises a base 42, at least one cutting blade 44 fixed to the base, and a cable block 46 resiliently attached to the base 22. The base 42 has a plurality of holes 43 formed therein that receive fasteners therein to mount the base 42 to the interior surface of the sidewall 11 of the hand hole 10 or other stationary component of the communications service network, as previously described. The base 42 further defines a cavity 45 for receiving the cable block 46 therein. A conventional strain relief means 48, preferably of the type previously described, and most preferably a cable clamp, is secured to the upper surface of the cable block 46 for receiving the communications cable 12 therein.

At least one linear coil spring 52 is positioned within the cavity 45 between the cable block 46 and the base 42. The coil spring(s) 52 bias the cable block 46 in an extended position so that the communications cable 12 is positioned above the cutting blade 44. The cable block 46 and the coil spring(s) 52 are maintained in the cavity 45 by a retaining plate 50 that is secured to the base 42 by fasteners received in holes 49 provided in the upper surface of the base 42. When an excessive pulling force is exerted on the communications cable 12, for example when the customer cable portion of the communications cable 12 is inadvertently entangled by an errant augur or trenching operation, tension on the strain relief means 48 causes the cable block 46 to move downwardly relative to the base 42. As a result, the communications cable 12 comes into contact with the cutting blade 44 and is cleanly severed at the location of the cable breakaway assembly 40 within the hand hole 11.

Obviously, those skilled in the art will immediately appreciate that many alternative embodiments of the invention described herein are possible without departing from the spirit of the invention. Accordingly, it is intended that the invention be construed broadly enough to encompass any and all alternative embodiments that are within the spirit and scope of the invention as illustrated and described by the written description, accompanying drawings and appended claims.

That which is claimed is:

1. A cable breakaway assembly for preventing damage to a first portion of a communications cable in die event that an excessive pulling force is applied to a second portion of the communications cable, the assembly comprising:

a base adapted for mounting to a stationary component of a communications service network;

at least one cutting blade fixed to the base;

a swing arm rotatably attached to the base;

first strain relief means for securing the communications cable to the swing arm; and biasing means for maintaining the swing arm in an extended position wherein the communications cable is not in contact with the cutting blade and for bringing the swing arm into a retracted position wherein the communications cable is in contact with the cutting blade when the excessive palling force is applied to the second portion of the communications cable so that the cutting blade severs the communications cable without damaging the first portion of the communications cable.

2. The assembly of claim 1 wherein the biasing means comprises a torsion sprig between the base and the swing arm.

3. The assembly of claim 1 wherein the first strain relief means is selected from the group consisting of a cable tie, a cable clamp, and a compression sleeve.

4. The assembly of claim 1 further comprising second strain relief means for securing the communications cable to the stationary component of the communications service network at a location remote from the cutting blade.

5. The assembly of claim 4 wherein the second strain relief means is selected from the group consisting of a cable tie, a cable clamp, and a compression sleeve.

6. The assembly of claim 4 wherein the second strain relief means comprises a back plate secured to the stationary component of the communications service network and at least one cable clamp attached to the back plate for securing the cable therein.

7. The assembly of claim 1 further comprising a protective cover movable between an open position wherein the swing an and the cutting blade are accessible and a closed position wherein the swing arm and the cutting blade are inaccessible.

8. The assembly of claim 1 wherein the base is generally symmetrical so that the relative locations of the swing arm and the cutting blade are reversible, thereby permitting the communications cable to be routed trough the stationary component of the communications service network in either direction.

9. A cable breakaway assembly for preventing damage to the feeder portion of a communications cable in the event that an excessive pulling force is applied to the customer portion of the communications cable, the assembly comprising:

a base adapted for mounting to a stationary component of a communications service network;

at least one cutting blade fixed to the base;

a swing arm rotatably attached to the base for bringing the communications cable into contact with the cutting blade when the excessive pulling force is applied to the customer portion of the communications cable so that the cutting blade severs the communications cable without damaging the feeder portion of the communications cable;

first strain relief means for securing the communications cable to the swing arm;

a torsion spring for biasing the swing arm in an extended position wherein the communications cable is not in contact with the cutting blade; and second strain relief means for securing the communications cable to the stationary component at a location that is remote from the cutting blade.

10. A cable breakaway assembly for severing a cable, the assembly comprising:

a base;

at least one cutting blade fixed to the base;

a swing arm rotatably attached to the base;

first strain relief means for securing the cable to the swing arm; and biasing means for maintaining the swing arm in an extended position wherein the cable is not in contact with the cutting blade and for bringing the swing arm into a retracted position wherein the cable is in contact with the cutting blade when an excessive pulling force is applied to the cable so that the cutting blade severs the cable.

* * * * *